(12) United States Patent
Ham

(10) Patent No.: US 9,745,923 B2
(45) Date of Patent: Aug. 29, 2017

(54) FUEL FILTER HEATING DEVICE

(71) Applicant: Hyundai Motor Company, Seoul (KR)

(72) Inventor: Chang Ho Ham, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 90 days.

(21) Appl. No.: 14/959,507

(22) Filed: Dec. 4, 2015

(65) Prior Publication Data

US 2017/0082071 A1  Mar. 23, 2017

(30) Foreign Application Priority Data

Sep. 23, 2015 (KR) .................. 10-2015-0134276

(51) Int. Cl.
| | |
|---|---|
| *F02G 5/00* | (2006.01) |
| *F02M 31/16* | (2006.01) |
| *F02M 26/13* | (2016.01) |
| *F01N 5/02* | (2006.01) |
| *F02M 31/08* | (2006.01) |
| *F02M 31/04* | (2006.01) |
| *F02M 31/07* | (2006.01) |

(52) U.S. Cl.
CPC ............. *F02M 31/16* (2013.01); *F01N 5/02* (2013.01); *F02M 26/13* (2016.02); *F02M 31/04* (2013.01); *F02M 31/042* (2013.01); *F02M 31/07* (2013.01); *F02M 31/08* (2013.01)

(58) Field of Classification Search
CPC ...... F02M 31/04; F02M 31/042; F02M 31/07; F02M 31/08; F02M 31/16; F02M 31/005; F02M 2025/0881; F02M 37/223; F02M 21/02
USPC ........................................... 123/557
See application file for complete search history.

(56) References Cited

FOREIGN PATENT DOCUMENTS

| EP | 1 036 930 A1 | 9/2000 |
|---|---|---|
| JP | 2003-535265 A | 11/2003 |
| KR | 10-1998-0014778 A | 5/1998 |
| KR | 10-2001-0099564 A | 11/2001 |
| KR | 10-2006-0117670 A | 11/2006 |
| KR | 10-2012-0032269 A | 4/2012 |
| KR | 10-2014-0069435 A | 6/2014 |

*Primary Examiner* — Hung Q Nguyen
*Assistant Examiner* — Charles Brauch
(74) *Attorney, Agent, or Firm* — Morgan, Lewis & Bockius LLP

(57) ABSTRACT

A fuel filter heating device may include an exhaust gas pipe through which exhaust gas generated from an engine flows, a heat transfer medium, which is disposed near a fuel filter to receive radiation heat transferred from the exhaust gas pipe and transfer the radiation heat to the fuel filter upon contacting the fuel filter, and a temperature-sensitive actuator for moving the heat transfer medium in a selected direction depending on the temperature of fuel in the fuel filter such that the heat transfer medium contacts the fuel filter to heat the fuel in the fuel filter or the heat transfer medium is separated from the fuel filter to block heat transfer therebetween.

9 Claims, 4 Drawing Sheets

OPERATION UNDER LOW TEMPERATURE

OPERATION UNDER LOW TEMPERATURE

FUEL FILTER HEATING DEVICE

CROSS-REFERENCE TO RELATED APPLICATION

The present application claims priority to Korean Patent Application No. 10-2015-0134276 filed on Sep. 23, 2015, the entire contents of which is incorporated herein for all purposes by this reference.

BACKGROUND

Field of the Invention

The present disclosure relates to a fuel filter heating device. More particularly, the present disclosure relates to a fuel filter heating device designed to increase the temperature of fuel introduced into a diesel fuel filter when the temperature of the fuel is low, as in the winter season.

Description of Related Art

Engines used in vehicles may be broadly classified into gasoline engines and diesel engines.

The gasoline engine, which is an internal combustion engine designed to run on gasoline, generates power by injecting air and gasoline into a cylinder and burning the compressed gasoline mixture with ignition initiated by an electric spark.

In contrast, a diesel engine, which is an internal combustion engine designed to run on diesel fuel, generates power by drawing air into a cylinder by means of a piston, compressing the air under high pressure, and burning fuel by injecting the fuel into the compressed air under high pressure and high temperature through auto-ignition.

The diesel engine has advantages over the gasoline engine in that fuel consumption is decreased by virtue of better heat efficiency, the cost of operation is decreased because the fuel is inexpensive, and the fuel is widely used, thereby providing flexibility in use of alternative fuel.

In the diesel engine, since diesel fuel contains a large amount of extraneous substances and moisture, a filtering procedure of eliminating impurities such as extraneous substances and moisture from the fuel is required prior to supplying the fuel to an engine. For the purpose of filtering, a fuel filter is used.

The fuel filter is provided with a PTC heater, which serves to heat diesel fuel, thereby increasing the temperature of the fuel when the temperature of the fuel is low.

However, since a conventional PTC heater, which is mostly used during the winter season, consumes a large amount of battery power, it has an adverse influence in that it discharges a battery and reduces the fuel efficiency of the vehicle. Furthermore, since a bimetal switch, which is a kind of ON/OFF switch that is sensitive to temperature, is repeatedly turned on and off depending on the temperature of the fuel, the frequent on/off operation of the bimetal switch has an adverse influence on its durability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a novel fuel filter heating device capable of efficiently controlling the temperature of fuel in a diesel fuel filter without an electric heater, which consumes battery power and associated electronic components.

In one aspect, the present invention provides a fuel filter heating device including an exhaust gas pipe through which exhaust gas, generated from an engine, flows, a heat transfer medium, which is disposed near a fuel filter so as to receive radiation heat transferred from the exhaust gas pipe and transfer the radiation heat to the fuel filter upon contacting the fuel filter, and a temperature-sensitive actuator for moving the heat transfer medium in a selected direction depending on the temperature of fuel in the fuel filter such that the heat transfer medium contacts the fuel filter to heat the fuel in the fuel filter or the heat transfer medium is separated from the fuel filter to prevent heat transfer therebetween.

In an exemplary embodiment, the exhaust gas pipe may be an exhaust gas recirculation (EGR) pipe of an exhaust gas recirculation (EGR) apparatus.

In another exemplary embodiment, the heat transfer medium may be configured to have a plate shape, capable of contacting the outer surface of the fuel filter in a surface-contact manner, and may be coupled to the temperature-sensitive actuator.

In still another exemplary embodiment, the heat transfer medium may include a support plate, which is disposed on an outer side of the heat transfer medium so as to face the exhaust gas pipe and to which the temperature-sensitive actuator is coupled, and a heat transfer thermal pad, which is coupled to the inner surface of the support plate so as to allow heat transfer to the outer surface of the fuel filter.

In yet another exemplary embodiment, the support plate may be a heat protector which is made of a material capable of blocking at least a portion of radiation heat generated from the exhaust gas pipe.

In still yet another exemplary embodiment, the temperature-sensitive actuator may be disposed at a lower portion of the fuel filter, and the heat transfer medium may be disposed under the fuel filter.

In a further exemplary embodiment, the exhaust gas pipe may be disposed under the fuel filter.

In another further exemplary embodiment, the temperature-sensitive actuator may be a thermostat-type actuator, the thermostat-type actuator including a wax element which expands or contracts depending on the temperature of the fuel filter, and a pin, which is coupled at a front end thereof to the heat transfer medium and which is moved forward or rearward in response to expansion or contraction of the wax element so as to move the heat transfer medium.

In still another further exemplary embodiment, the portion of the temperature-sensitive actuator that contains the wax element may be disposed inside the lower portion of the fuel filter.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has at least two sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
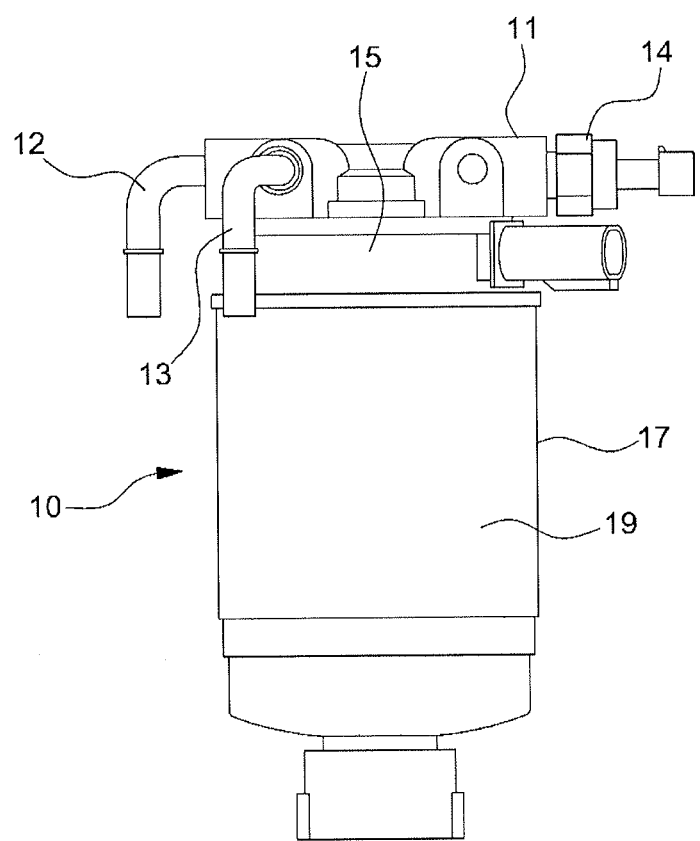
FIG. 1 is a perspective view showing a conventional diesel fuel filter equipped with a heating apparatus.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the attached drawings so as to enable the embodiments to be easily understood by one of ordinary skill in the art to which this invention belongs.

Prior to the explanation of the present invention, in order to assist in understanding the present invention, a conventional diesel fuel filter and a heating apparatus for the diesel fuel filter are first described with reference to FIGS. 1 and 2.

FIG. 1 is a perspective view showing a conventional diesel fuel filter equipped with a heating apparatus. As shown in the drawing, a head part 11 of the diesel fuel filter 10 is provided at one position thereof with a fuel inlet 12, through which fuel is introduced, and at another position thereof with a fuel outlet 13, through which fuel from which impurities such as contaminants and moisture have been removed, is discharged.

A housing of a filter part 17, which is disposed under and coupled to the head part 11 and a heating part 15, accommodates a filter element 19 for removing impurities. Fuel, which is introduced through the fuel inlet 12, is filtered through the filter element 19 and is then discharged through the fuel outlet 13.

The heating part 15 is coupled between the head part 11 and the filter part 17. When the diesel fuel is at a low temperature, the heating part 15 heats the fuel, which is introduced through the fuel inlet 12, so as to increase the temperature of the fuel.

As a heating means which is provided in the heating part 15, an electric heater, for example, a PTC heater, which is operated by the supply of battery power, is commonly used. The fuel, which is introduced through the fuel inlet 12, is heated while passing through the PTC heater provided in the heating part 15.

The head part 11 is provided with a bimetal switch 14 such that the PTC heater is turned on or off depending on the temperature of the fuel.

Diesel fuel is characterized in that a paraffin component thereof is crystallized at lower temperatures. Hence, the crystallized component of the diesel fuel clogs the pores of the filter element 19 of the diesel filter 10 during the winter season, thereby causing problems related to the supply of fuel and to starting the engine.

In other words, since the temperature of the fuel in the diesel filter 10 is low upon starting up during the winter season, the paraffin component of the diesel filter may be crystallized, thereby causing a problem in start-up capability of an engine under low temperature.

Accordingly, in order to improve fluidity and start-up capability of diesel at low temperatures, a PTC heater 16 (see FIG. 2) is mounted in the heating part 15 near the inlet of the filter so as to heat fuel when the fuel is at a low temperature.

The ON/OFF operation of the PTC heater 16 is controlled by the ON/OFF operation of the bimetal switch 14, which is actuated depending on the temperature of the fuel. FIG. 2, which intends to illustrate this operation, is a schematic view showing the circuit connections in the PTC heater 16.

Figure 2:
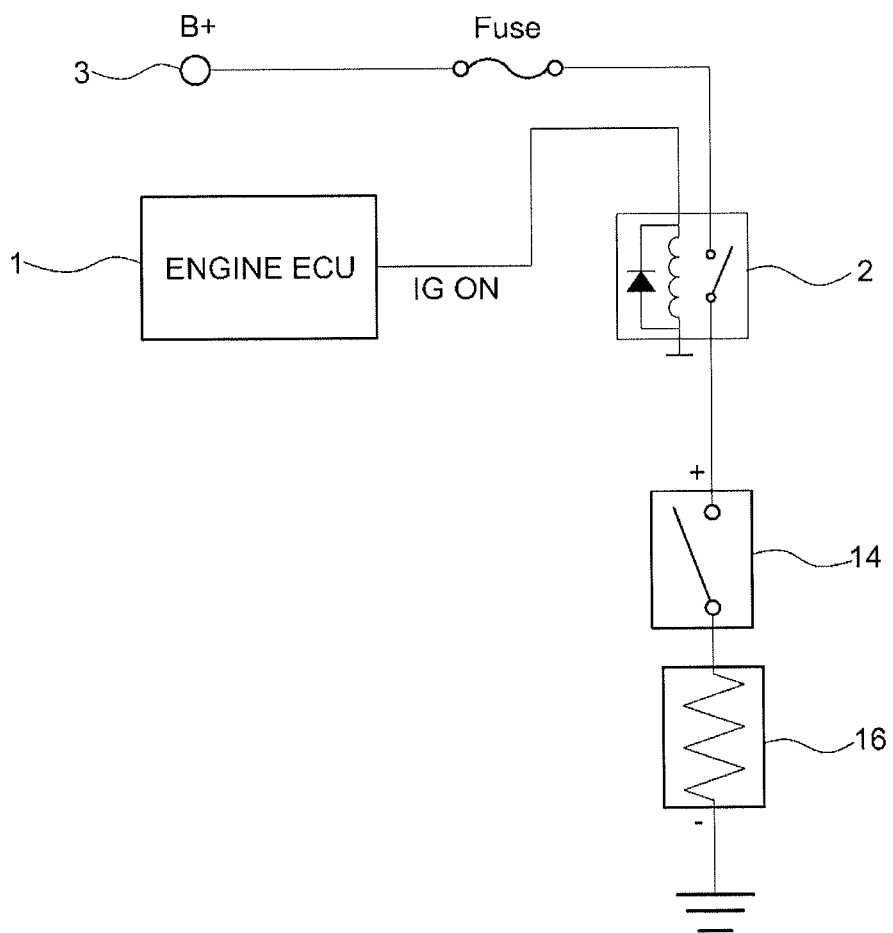
FIG. 2 is a schematic view showing the circuit connection of a conventional PTC heater.

As shown in FIG. 2, when an IG is turned on (IG ON), a fuel filter heater relay 2 is turned on. Thereafter, when the temperature of the fuel is low, the bimetal switch 14 is turned on so as to enable the power of a battery 3 to be supplied to the PTC heater 16.

Consequently, the PTC heater 16 generates heat to heat the fuel.

When the temperature of fuel becomes high, the bimetal switch 14 is turned off, and the supply of power from the battery 3 is thus interrupted, thereby turning off the PTC heater 16.

Here, the conventional PTC heater has adverse influences in that a battery is early discharged and in that the fuel efficiency of the vehicle is decreased, and the durability of the bimetal switch is reduced due to the frequent ON/OFF actuation thereof.

In order to solve the problem, the fuel filter heating device according to the present invention, which is intended to heat fuel introduced into the diesel fuel filter and to thus increase the temperature of the fuel when the fuel is at a low temperature such as during the winter season, is constructed to heat the fuel in the fuel filter using the heat of exhaust air from an engine.

In order to construct the present invention, there is a need to provide a high temperature part, for emitting the heat of exhaust gas generated from the engine, near the fuel filter. In a diesel fuel filter which is directly mounted on the engine, high-temperature parts, such as an exhaust gas pipe through which exhaust gas discharged from the engine passes, are disposed at areas near the diesel fuel filter.

In order to meet this necessity, the present invention is designed to use as a heat source an exhaust gas pipe through which exhaust gas flows, preferably an exhaust gas recirculation pipe (hereinafter referred to as "EGR pipe") which constitutes an exhaust gas recirculation (EGR) apparatus.

In an arrangement in which a diesel fuel filter is directly mounted on an engine, when the fuel filter is heated excessively, problems related to the performance of various parts of the fuel filter may occur. Furthermore, when the temperature of the fuel in the fuel filter is excessively increased, problems related to the control of the engine and stopping of the engine may occur.

Accordingly, in an arrangement in which a high-temperature part such as the EGR pipe extends through a neighboring area near the fuel filter, a heat protector is applied in order to prevent adverse effects caused by heat generated from the EGR pipe.

Such a high-temperature part may be used as a heat source capable of heating the fuel in the diesel fuel filter when the engine is started at a low temperature, such as during the winter season.

Accordingly, the fuel filter heating device according to the present invention is constructed such that a high-temperature part of the engine, which is disposed near the fuel filter, heats the fuel in the diesel fuel filter when starting up at a low temperature. Here, the high-temperature part of the engine may be an exhaust pipe, preferably an EGR pipe, through which exhaust gas of the engine passes.

Figure 3:
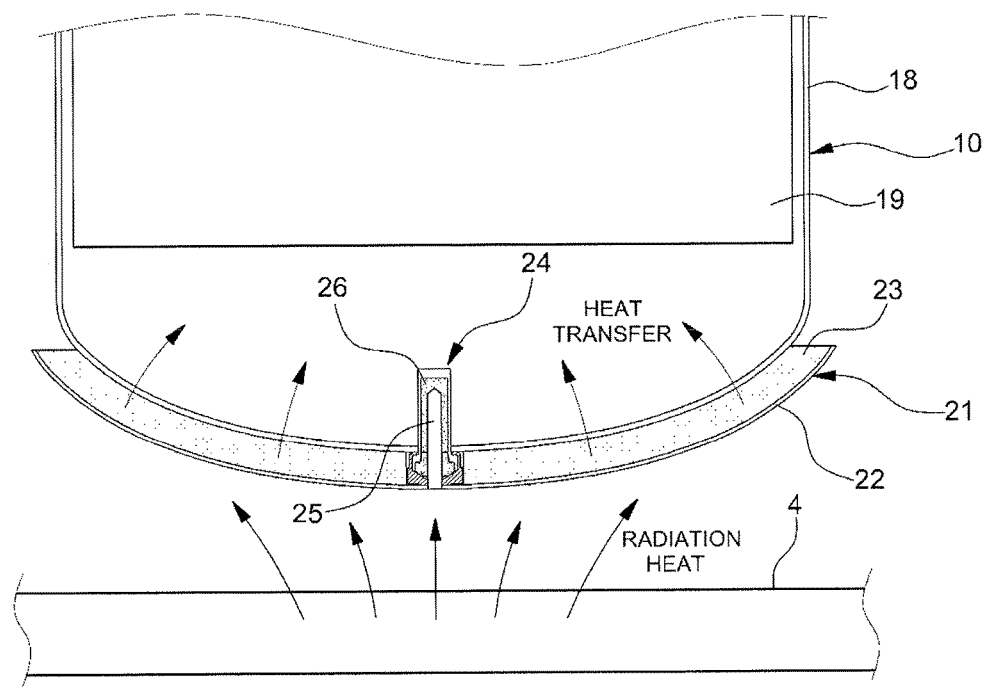
FIG. 3 is a schematic cross-sectional view showing the fuel filter heating device according to the present invention.

FIG. 3 is a schematic cross-sectional view showing the fuel filter heating device according to the present invention. In the diesel fuel filter 10 directly mounted on the engine, since the EGR pipe 4 extends under the diesel fuel filter 10, heat energy of the EGR pipe 4 may be used to heat the fuel in the diesel fuel filter.

As known in the related art, the EGR apparatus includes an EGR cooler, which serves to lower the temperature of recirculation exhaust gas (hereinafter referred to as "EGR gas"), which is discharged from the engine and is supplied to an intake manifold of the engine through the EGR pipe.

However, since EGR gas is by-passed so as not to pass through the EGR cooler such that the engine is preheated and the fuel efficiency is improved when the engine is started at a low temperature, high-temperature EGR gas is supplied to the intake manifold of the engine at the time at which the EGR pipe exhibits the highest temperature.

Because heat is required to heat the fuel in the diesel fuel filter when the engine is started at a low temperature, the present invention is constructed to selectively heat the fuel in the diesel fuel filter only when the engine is started at low temperature.

According to an embodiment of the present invention, the fuel filter heating device includes an exhaust gas pipe 4, serving as a heat source, which extends near the fuel filter 10 and through which exhaust gas from the engine flows, a heat transfer medium 21, which is disposed near the fuel filter 10 so as to receive radiation heat transferred from the exhaust gas pipe 4 and which transfers the radiation heat to the fuel filter 10 upon contacting the fuel filter 10, and a temperature-sensitive actuator 24 for moving the heat transfer medium 21 in a selected direction depending on the temperature of the fuel in the fuel filter 10 such that the heat transfer medium 21 comes into contact with the fuel filter 10 so as to heat the fuel in the fuel filter 10 or is spaced apart from the fuel filter 10 so as to prevent heat transfer from the fuel filter 10.

The exhaust gas pipe 4, which is used as a heat source, may be an EGR pip through which EGR gas flows and which generates radiation heat when high temperature EGR gas passes through the EGR pipe 4.

The heat transfer medium 21 is constructed to receive radiation heat generated from the EGR pipe 4 and to transfer the radiation heat to the fuel filter 10 so as to heat the fuel in the fuel filter 10. The heat transfer medium 21 is constituted by a plate-shaped structure which is capable of contacting the outer surface of the housing 18 of the fuel filter 10, that is, the outer surface of the bottom of the housing 18 of the fuel filter 10, with a large contact surface, as in this embodiment.

In an exemplary embodiment, the heat transfer medium 21 may include a support plate 22, disposed on the outer surface thereof to face the EGR pipe 4, and a heat transfer thermal pad 23, which is disposed on the inner surface of the support plate 22 and contacts the outer surface of the housing 18 of the fuel filter 10 so as to transfer heat to the fuel filter 10.

The support plate 22 may be a known heat protector capable of blocking at least a portion of the radiation heat generated from the EGR pipe 4. The heat protector 22 may be made of the same material as that of an existing heat protector which is used for directly mounting a fuel filter to an engine.

The heat protector 22 blocks at least a portion of the radiation heat generated from the EGR pipe 4 so as to prevent heat damage to the fuel filter 10 caused by excessive radiation heat.

Since the present invention uses the EGR pipe 4, through which high temperature EGR gas passes, as a heat source, there is a need to prevent heat damage to the fuel filter 10 caused by excessive radiation heat generated from the EGR pipe 4. Accordingly, the plate-shaped heat protector, which is capable of blocking some of the radiation heat generated from the EGR pipe 4, is used as the support plate 22.

When the thermal pad 23 is closely attached to the outer surface of the housing 18 of the fuel filter 10, a portion of the radiation heat generated from the EGR pipe 4 may be partially shielded by the support plate 22, that is, the heat protector, and the remainder of the radiation heat may be transferred to the fuel filter 10 through the thermal pad 23 so as to heat the fuel in the fuel filter.

The temperature-sensitive actuator 24 serves as a driving unit, which is able to cause the heat transfer medium 21 to come into contact with the fuel filter 10 for heat transfer therebetween or to be spaced apart from the fuel filter 10 for heat shielding. The temperature-sensitive actuator 24 operates depending on the temperature of the fuel in the fuel filter.

In an exemplary embodiment, the temperature-sensitive actuator 24 may be a thermostat-type actuator in which a pin 25 is displaced to be movable upward and downward by the expansion or contraction of a wax element 26 contained therein.

The temperature-sensitive actuator 24 is fixedly positioned to the fuel filter 10 such that the portion that contains the wax element 26 therein is disposed inside the housing 18 of the fuel filter 10. The front end of the pin 25, which moves upward and downward depending on the state of the wax element 26, is fixedly coupled to the heat transfer medium 21, preferably the support plate 22 of the heat transfer medium 21.

The portion of the temperature-sensitive actuator 24 that contains the wax element 26 is disposed inside the bottom of the housing 18 of the fuel filter 10 so as to accurately reflect the temperature of the fuel in the fuel filter 10, and the front end of the pin 25 is coupled to the support plate 22, that is, the heat protector, of the heat transfer medium 21. Consequently, as the pin 25 is moves upward or downward depending on the temperature of the fuel in the fuel filter 10, the entire heat transfer medium 21 including the support plate (heat protector) 22 is moved.

In applying the thermostat-type actuator 24 to the fuel filter heating device according to the present invention, the front end of the pin 25 is coupled to the support plate 22 of the heat transfer medium 21, which serves as the heat protector, and the heat transfer thermal pad 23 is applied between the fuel filter 10 and the support plate 22 so as to improve adhesiveness.

Figure 4:
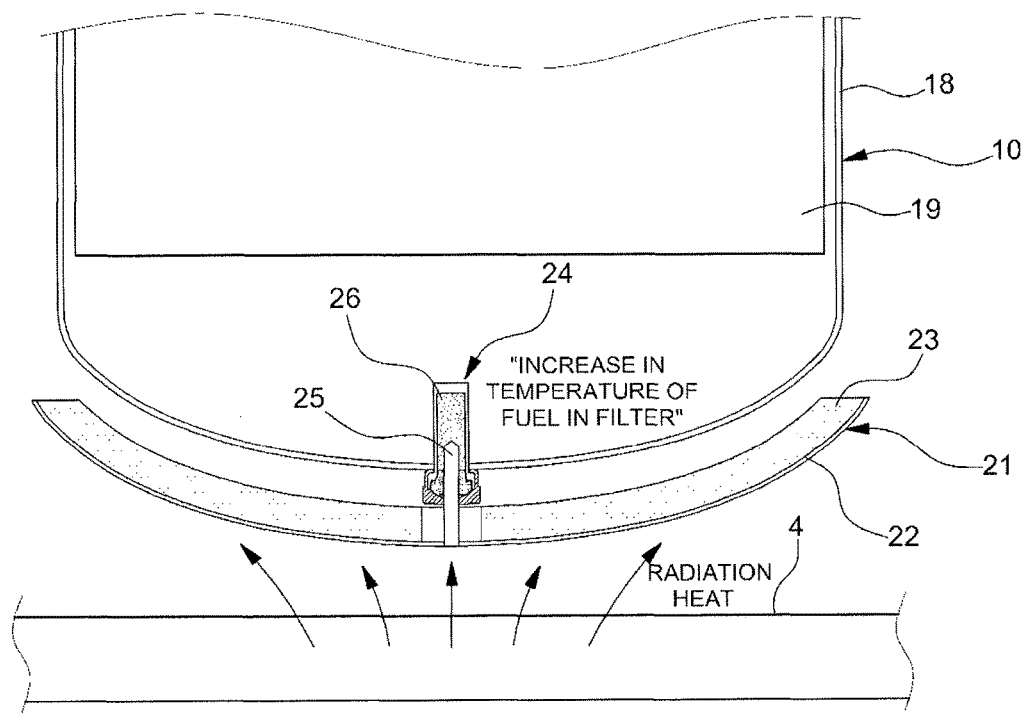
FIG. 4 is a schematic cross-sectional view showing the fuel filter heating device according to the present invention, which is in a state of blocking heat transfer.

Hereinafter, the operation of the fuel filter heating device according to the present invention is described with reference to FIGS. 3 and 4.

The fuel filter heating device according to the present invention can use heat energy of the EGR pipe 4, which is disposed under the fuel filter, in order to heat the fuel in the fuel filter 10, and enables radiation heat of the EGR pipe 4 to be selectively transferred to the fuel filter 10 only at the time of operation at low temperatures (i.e. when an engine starts at low temperatures) by virtue of the temperature-sensitive actuator 24, which is actuated depending on the internal temperature of the fuel filter 10.

In the case in which the thermostat-type actuator containing the wax element 26 is applied as the temperature-sensitive actuator 24, when the temperature of the fuel in the fuel filter 10 is increased, the wax element 26 expands and thus advances the pin 25. Hence, the movement of the pin 25 causes the heat transfer medium 21 to be spaced apart from the housing 18 of the fuel filter 10.

In the thermostat-type actuator 24, the distance that the pin 25 moves is determined by the heat expansion properties of the wax element 26 and the like. When the temperature of the fuel in the fuel filter 10 increases above a predetermined temperature, the support plate (i.e. heat protector) 22 is moved by the same distance that the pin 25 moves, and the thermal pad 23 is thus separated from the housing 18 of the fuel filter 10.

At the time of operation of the diesel fuel filter 10 at a low temperature, that is, when the engine is started at a low temperature, since the temperature of the fuel in the fuel filter is low, the wax element 26 contained in the actuator 24 is in a contracted state, and the pin 25 of the actuator is in a retracted state.

Accordingly, the heat transfer medium 21 is in contact with the bottom of the fuel filter 10, as shown in FIG. 3, and the radiation heat of the EGR pipe 4 is transferred to the fuel filter 10 through the heat transfer medium 21, which is constituted by the heat protector 22 and the thermal pad 23.

As a result, the fuel in the fuel filter 10 is heated by the radiation heat transferred through the heat transfer medium 21, and the temperature of the fuel is thus increased.

At the time of operation of the diesel fuel filter 10 at a high temperature, the wax element 26 contained in the actuator 24 expands, thereby advancing the pin 25. Accordingly, the heat transfer medium 21 is lowered and is thus released from the state of contact with the fuel filter 10, as shown in FIG. 4.

At this time, since the thermal pad 23 of the heat transfer medium 21 is separated from the fuel filter 10, the support plate 22, particularly the heat protector fulfills its inherent function, that is, the function of blocking radiation heat generated from the EGR pipe 4.

As is apparent from the above description, when the temperature of the fuel in the fuel filter is low, the fuel filter heating device according to the present invention uses the pipe through which exhaust gas discharged from the engine passes, that is, the EGR pipe as the heat source in order to heat the fuel in the diesel fuel filter and to thus increase the temperature of the fuel. Therefore, it is possible to solve problems occurring in a conventional electric heater which consumes battery power, that is, problems of battery discharge and decreased fuel efficiency, and it is possible to solve problems related to the use of electronic components such as a bimetal switch, that is, deterioration of durability.

In other words, it is possible to efficiently control the temperature of fuel in the fuel filter without an additional electric heater and associated components such as an electronic sensor and a switch, and it is anticipated that fuel efficiency is increased and factors causing malfunction of electronic parts are eliminated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel filter heating device comprising:
   an exhaust gas pipe through which exhaust gas generated from an engine flows;
   a heat transfer medium, which is disposed near a fuel filter to receive radiation heat transferred from the exhaust gas pipe and transfer the radiation heat to the fuel filter when contacting the fuel filter; and
   a temperature-sensitive actuator for moving the heat transfer medium in a selected direction depending on a temperature of fuel in the fuel filter such that the heat transfer medium contacts the fuel filter to heat the fuel in the fuel filter or the heat transfer medium is separated from the fuel filter to prevent heat transfer therebetween.

2. The fuel filter heating device according to claim 1, wherein the exhaust gas pipe is an exhaust gas recirculation (EGR) pipe of an exhaust gas recirculation (EGR) apparatus.

3. The fuel filter heating device according to claim 1, wherein the heat transfer medium includes a plate shape contacting an outer surface of the fuel filter in a surface-contact manner, and is coupled to the temperature-sensitive actuator.

4. The fuel filter heating device according to claim 1, wherein the heat transfer medium comprises:
   a support plate, which is disposed at an outer side of the heat transfer medium to face the exhaust gas pipe and to which the temperature-sensitive actuator is coupled; and
   a heat transfer thermal pad coupled to an inner surface of the support plate to allow heat transfer to an outer surface of the fuel filter.

5. The fuel filter heating device according to claim 4, wherein the support plate is a heat protector which is made of a material capable of blocking at least a portion of the radiation heat generated from the exhaust gas pipe.

6. The fuel filter heating device according to claim 1, wherein the temperature-sensitive actuator is disposed at a lower portion of the fuel filter, and the heat transfer medium is disposed under the fuel filter.

7. The fuel filter heating device according to claim 6, wherein the exhaust gas pipe is disposed under the fuel filter.

8. The fuel filter heating device according to claim 1, wherein the temperature-sensitive actuator is a thermostat-type actuator, the thermostat-type actuator comprising:
- a wax element which expands or contracts depending on the temperature of the fuel filter; and
- a pin, in which a front end thereof is coupled to the heat transfer medium, and which is moved forward or rearward in response to expansion or contraction of the wax element to move the heat transfer medium.

9. The fuel filter heating device according to claim 8, wherein a portion of the temperature-sensitive actuator that contains the wax element, is disposed inside a lower portion of the fuel filter.

\* \* \* \* \*